United States Patent
Embler et al.

(10) Patent No.: US 9,211,960 B2
(45) Date of Patent: Dec. 15, 2015

(54) SYSTEM AND METHOD FOR ATTACHING THERMAL PROTECTION, INSULATION AND SECONDARY STRUCTURES TO SANDWICH STRUCTURES

(75) Inventors: Jonathan Embler, Huntington Beach, CA (US); Jeff Eichinger, Fountain Valley, CA (US); Edward Zadorozny, Redondo Beach, CA (US); Billy Liu, Alhambra, CA (US)

(73) Assignee: The Boeing Company, Chicago, IL (US)

( * ) Notice: Subject to any disclaimer, the term of this patent is extended or adjusted under 35 U.S.C. 154(b) by 804 days.

(21) Appl. No.: 12/255,580

(22) Filed: Oct. 21, 2008

(65) Prior Publication Data

US 2010/0095626 A1    Apr. 22, 2010

(51) Int. Cl.
| | |
|---|---|
| *B64G 1/58* | (2006.01) |
| *B64C 1/40* | (2006.01) |
| *F16B 33/00* | (2006.01) |
| *F16B 35/06* | (2006.01) |
| *F16B 19/10* | (2006.01) |

(52) U.S. Cl.
CPC ... *B64G 1/58* (2013.01); *B64C 1/40* (2013.01); *B64C 1/403* (2013.01); *F16B 33/002* (2013.01); *F16B 35/06* (2013.01); *F16B 19/1045* (2013.01)

(58) Field of Classification Search
CPC ....... E04F 13/00; E04F 13/08; E04F 13/0801; E04F 13/0803; E04F 13/0805; E04F 13/0808; E04F 13/0846; F16B 37/04; F16B 37/044; F16B 37/045; F16B 21/00; F16B 21/09; F16B 13/002; F16B 35/06; F16B 19/1045; B60R 13/0206; B64C 1/066; B64C 1/40; B64C 1/403; B64D 11/0696; B64G 1/58
USPC ................. 52/506.05, 506.06, 511, 512, 513, 52/787.12, 745.21; 244/119, 131, 132; 411/107, 111, 113, 965
See application file for complete search history.

(56) References Cited

U.S. PATENT DOCUMENTS

| | | | | |
|---|---|---|---|---|
| 2,820,499 | A * | 1/1958 | Schaaf | 411/103 |
| 3,339,609 | A * | 9/1967 | Cushman | 411/82.1 |
| 3,476,211 | A * | 11/1969 | Cormier | 182/22 |
| 3,504,723 | A * | 4/1970 | Cushman et al. | 411/82.1 |
| 3,526,072 | A * | 9/1970 | Campbell | 52/787.1 |

(Continued)

FOREIGN PATENT DOCUMENTS

| | | | | |
|---|---|---|---|---|
| FR | 2 609 276 | | 2/1987 | ............... B64G 1/58 |
| WO | WO 97/45648 | | 4/1997 | ............. F16B 43/00 |

OTHER PUBLICATIONS

Cleland, et al., "Thermal Protection System of the Space Shuttle", NASA Contractor Report 4227, Contract NASW-3841-72, Jun. 1989.

(Continued)

*Primary Examiner* — Basil Katcheves
*Assistant Examiner* — Theodore Adamos
(74) *Attorney, Agent, or Firm* — Toler Law Group, PC

(57) ABSTRACT

A floating stud assembly system of particular use in attaching insulating material to aircraft structures is described employing a stud extended through a hole in a plate. The plate comprises a pocket or cavity and an end of the stud is configured to reside in the pocket or cavity such that the stud is retained by the plate while still being allowed movement in a plane.

20 Claims, 6 Drawing Sheets

(56) References Cited

U.S. PATENT DOCUMENTS

| | | | | |
|---|---|---|---|---|
| 3,770,036 | A | * | 11/1973 | Sherman ................. 411/508 |
| 4,496,271 | A | * | 1/1985 | Spinosa et al. ............. 410/105 |
| 4,971,496 | A | * | 11/1990 | Scholz ................... 411/105 |
| 5,131,621 | A | * | 7/1992 | Sdano .................... 248/680 |
| 5,542,777 | A | * | 8/1996 | Johnson .................. 403/389 |
| 5,547,628 | A | * | 8/1996 | Lacombe et al. .......... 264/621 |
| 5,823,727 | A | * | 10/1998 | Lee ......................... 411/85 |
| 5,946,875 | A | * | 9/1999 | Jeanseau ................. 52/506.08 |
| 6,260,813 | B1 | * | 7/2001 | Whitcomb ............... 248/503.1 |
| 6,261,042 | B1 | * | 7/2001 | Pratt ....................... 411/551 |
| 6,293,496 | B1 | | 9/2001 | Moe ........................ 244/120 |
| 6,813,865 | B2 | * | 11/2004 | Peterson ................. 52/506.05 |
| 8,720,761 | B2 | * | 5/2014 | Binder et al. ............. 224/557 |
| 2002/0043041 | A1 | * | 4/2002 | Yoyasu .................... 52/716.5 |
| 2008/0181745 | A1 | * | 7/2008 | Naik et al. ................ 411/107 |

OTHER PUBLICATIONS

International Search Report and Written Opinion, dated Feb. 28, 2009.

* cited by examiner

SYSTEM AND METHOD FOR ATTACHING THERMAL PROTECTION, INSULATION AND SECONDARY STRUCTURES TO SANDWICH STRUCTURES

STATEMENT REGARDING FEDERALLY SPONSORED RESEARCH

This invention was made with Government support under Contract No. AVTIP DO85, F33615-00-D-3052 awarded by the U.S. Air Force. The government has certain rights in this invention.

FIELD

This disclosure relates to a floating stud assembly and method for attaching elements to one another. The disclosure has particular utility for attaching thermal protection, stand-off panels or other secondary structures to sandwich primary structures such as may be used in the design and manufacture of aircraft and spacecraft, and will be described in connection with such utility, although other utilities are contemplated.

BACKGROUND

The Thermal Protection System (TPS) of spacecraft is an important development of the National Aeronautics and Space Administration (NASA). Broadly, the TPS of a spacecraft includes the various materials, manufacturing methods, design details, testing techniques and procedures of installation developed to protect the space shuttle vehicle from the severe temperature and heat transfer environments encountered in the various phases of each shuttle mission. A TPS typically includes three subsystems, a Reusable Surface Insulation Subsystem (RSISS), a Leading Edge Structural Subsystem (LESS) and a Penetration Subsystem (PSS). The RSISS constitutes most of the TPS and typically consists of flexible blankets and rigid ceramic-like tiles, plus the assembly concepts used to put the system together. The nature of the tiles make them extremely resistant to heat, but also brittle and susceptible to damage from structure-induced loads. Further, the tiles must be attached in a way capable of accommodating some level of error in alignment. That is, if tiles are slightly misaligned, they must not be attached in a way that pushes adjacent tiles into one another to the point that they are structurally unsound. Accordingly, tile-to-structure attaching systems have been developed that isolate the delicate tiles from damaging structure-induced loads.

Current tile-to-structure attaching systems include adhesive and mechanical methods of tile attachment. While existing adhesive methods provide for a strong and flexible bond to the structure, they do not allow for convenient removal and reattachment of the tiles. Tiles in areas that require frequent access to the structure of the aircraft or spacecraft are therefore made with a hole in the center of the tile allowing for placement of a metal fastener from outside the aircraft or spacecraft to affix the removable tile to the structure. A densified ceramic plug of refractory material similar to that of the tile is then used to plug the gap between the top of the metal fastener and the outer surface of the tiles. In this fastening arrangement, an internally threaded receptacle is placed inside an oversized hole of a densified ceramic plug made of refractory material similar to that of the tile. A close-cut disk is then inserted on top of the plug and the assembly is bonded to a mating hole in the tile using an adhesive. The resulting receptacle floats in the tile and can accommodate lateral misalignment of about 0.03 in. (0.076 cm.) and azimuthal misalignment of a few degrees.

While mechanical attachment systems allow for rapid attachment and removal of insulating tiles, they still require an assembly to be adhesively bonded to a mating hole in the tile. These inserts are further complicated in that they require attachment to special hard points within the sandwich structure of the vehicle.

SUMMARY

The present disclosure provides among other things a system and method for attaching a secondary structure to a sandwich structure. One aspect of the disclosure provides a floating stud assembly system comprising a plate for attachment to the structure. The plate encompasses a pocket or cavity with a hole within the pocket or cavity. A stud having a shaft having a diameter less than the diameter of the hole and a head having a diameter greater than the hole is designed to be inserted through the hole such that the plate retains the stud, with the head located in the pocket or cavity of the plate. The plate can thus be attached to the structure and the stud retained by the plate while remaining free to move in two directions within the constraints of the hole and the pocket or cavity.

The disclosure in another aspect also provides an assembly comprising first and second structures assembled together by a floating stud assembly system. The floating stud assembly system includes a plate attached to the first structure, and comprises a surface encompassing a pocket or cavity and having a hole within the pocket or cavity. A stud which comprises a shaft having a diameter less than the diameter of the hole extends through the hole. The stud has a head larger than the hole is configured to reside in the pocket or cavity and be retained by the plate. The end of the stud is larger than the hole such that the stud is retained by the plate and is allowed to move in two directions within the constraints of the hole and the pocket or cavity.

The disclosure also provides a method for mechanically attaching thermal protection panels to a structure on an aircraft or spacecraft, which comprises attaching the thermal panels to the structure using a floating stud that provides tolerance for movement in two directions. In a preferred embodiment the floating stud is held within an apertured plate that has a surface encompassing a pocket or cavity; and the stud extends through the aperture, wherein the stud has a head which is larger than the aperture such that the stud is retained by the plate and is allowed to move in two directions.

BRIEF DESCRIPTION OF THE SEVERAL VIEWS OF THE DRAWINGS

The features, functions, and advantages that have been discussed can be achieved independently in various embodiments of the present disclosure or may be combined in yet other embodiments further details of which can be seen with reference to the following description and drawings. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the disclosure. It will be understood, however, that the present disclosure may be practiced without these specific details. In other instances, known structures and devices are shown or discussed more generally in order to avoid obscuring the disclosure. In many cases, a description of the operation is sufficient to enable one to implement the various forms of the disclosure, particularly when the operation is to be implemented in software. It should be noted that there are many different and alternative configurations, devices and technologies to which the disclosed disclosure may be applied. The full scope of the disclosure is not limited to the examples that are described below.

Figure 1:
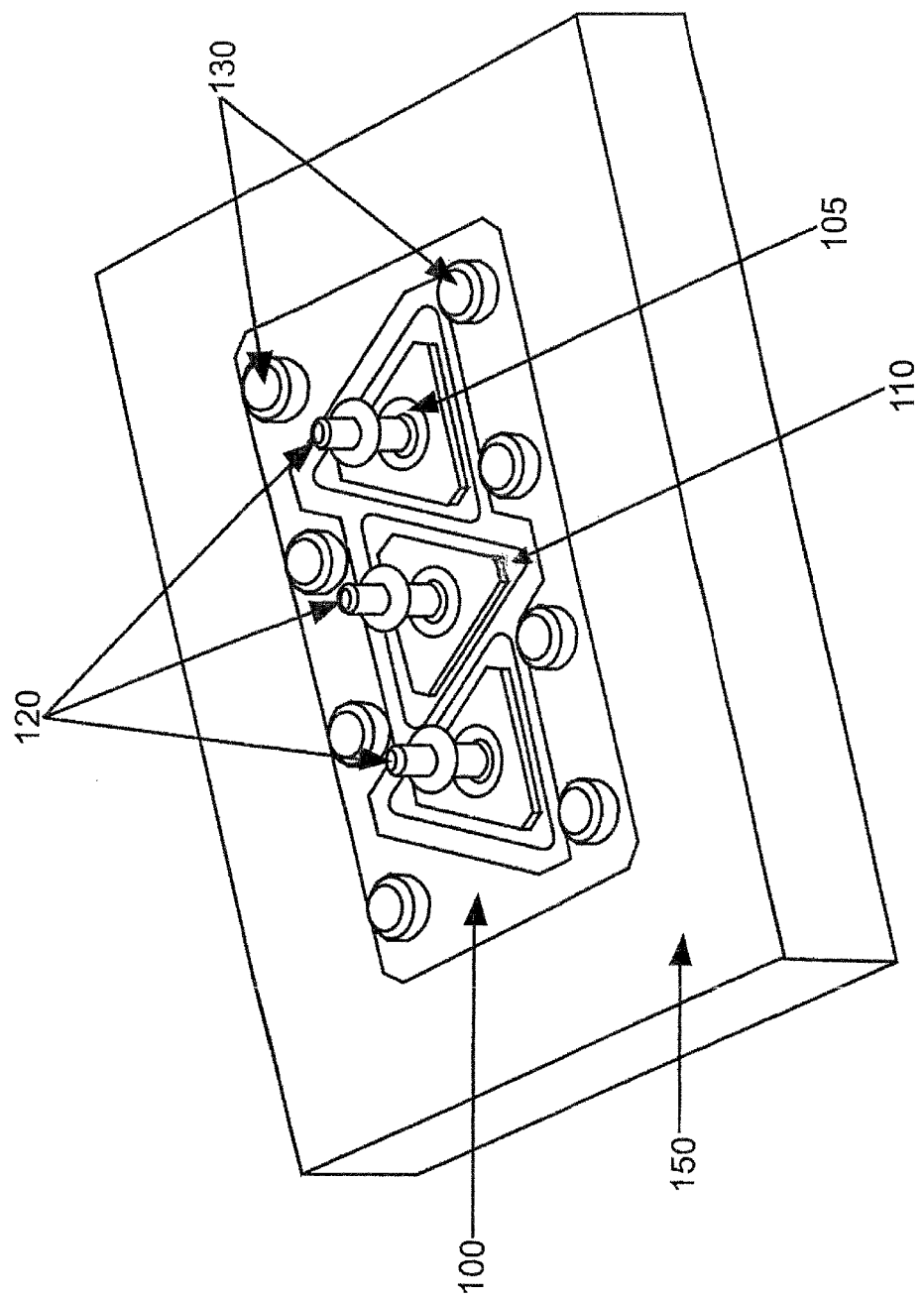
FIG. 1 is a perspective view of a floating stud assembly coupled to a composite sandwich substrate, in accordance with one embodiment of the present disclosure.
Figure 2:
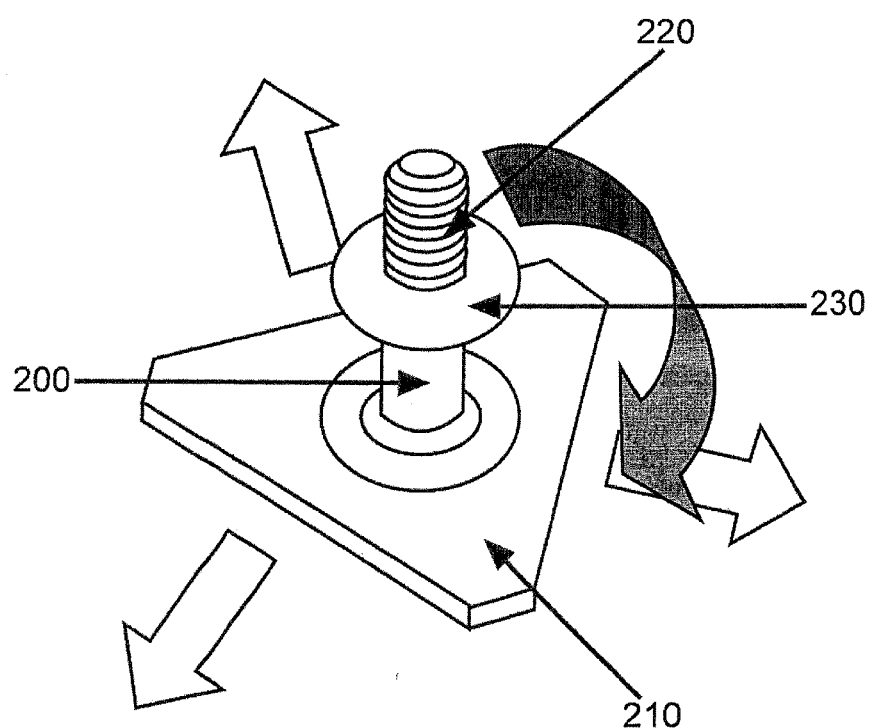
FIG. 2 is a perspective view showing details of the stud of the floating stud assembly.
Figure 4:
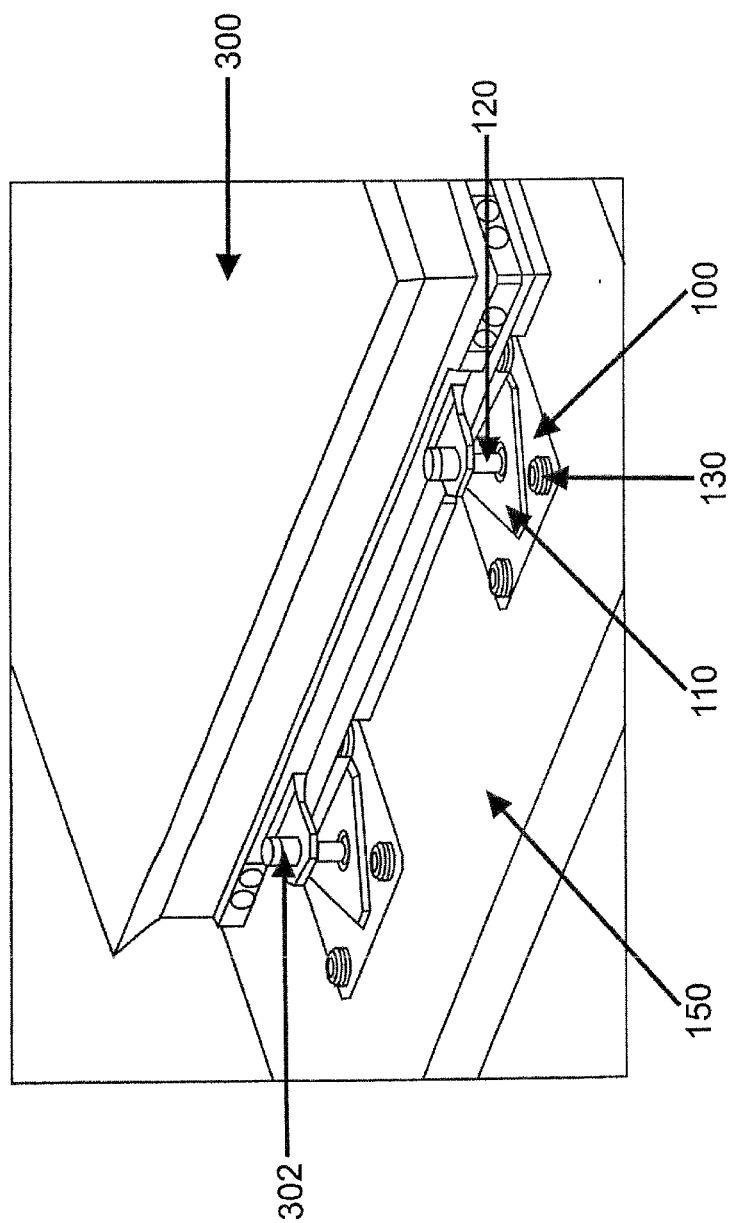
FIG. 4 is a partial perspective view illustrating a secondary structure coupled to a composite sandwich substrate with the floating stud assembly in accordance with the present disclosure.

Referring to FIGS. 1-2 and 4, in one application of the disclosure a plate 100 with a hole 105 is utilized with a stud 120 to attach a secondary structure 300 to a primary structure 150, typically a composite sandwich structure. Plate 100 encompasses at least one pocket or cavity 110 and is configured to be attached to structure 150. Plate 100 may comprise a titanium or titanium alloy to allow for high temperature use or may comprise any metal, metallic alloy, ceramic, carbon composite or other material that may be formed into a plate.

Figure 3A:
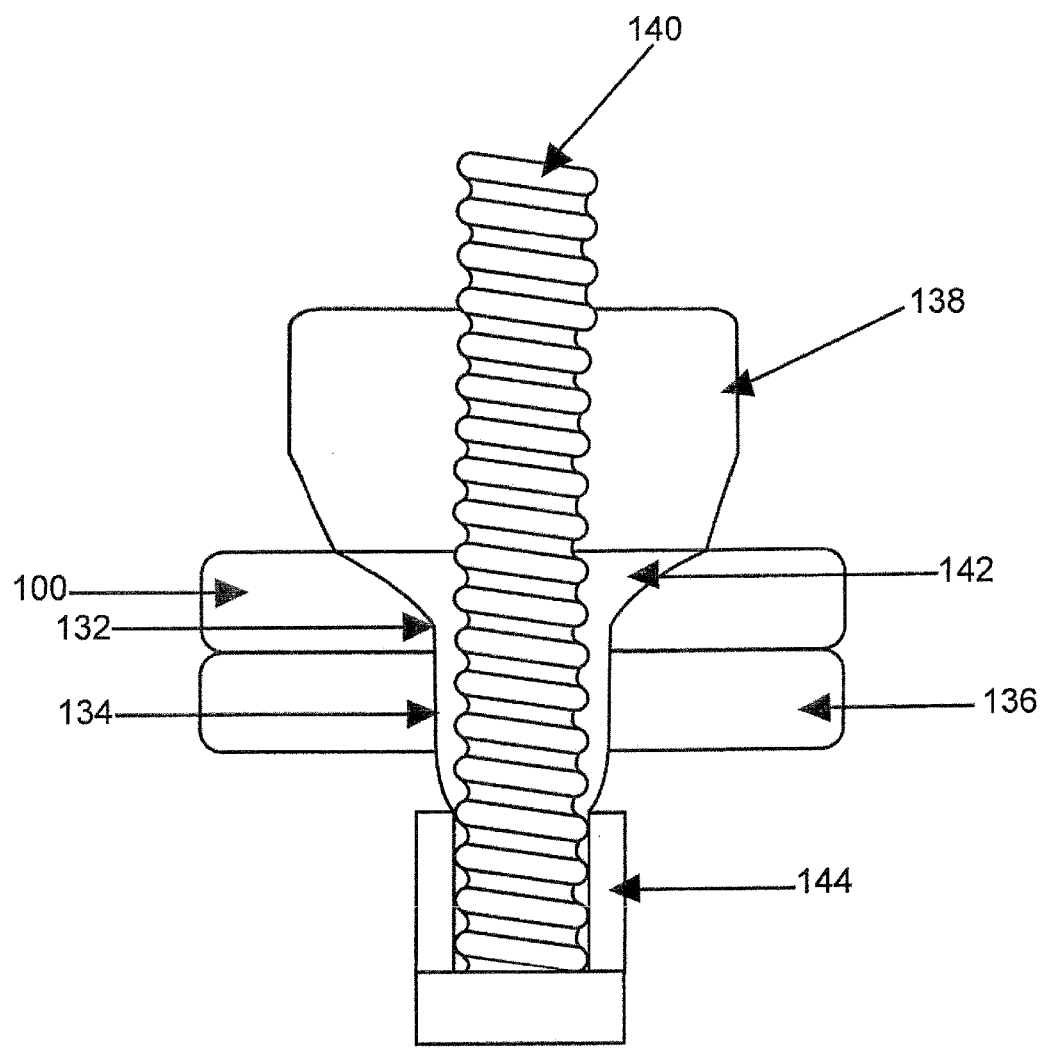
FIGS. 3(*a*)-3(*c*) are side elevation views, in cross-section, illustrating installation of the floating stud assembly retaining plate in a composite sandwich structure in accordance with an embodiment of the disclosure.
Figure 3B:
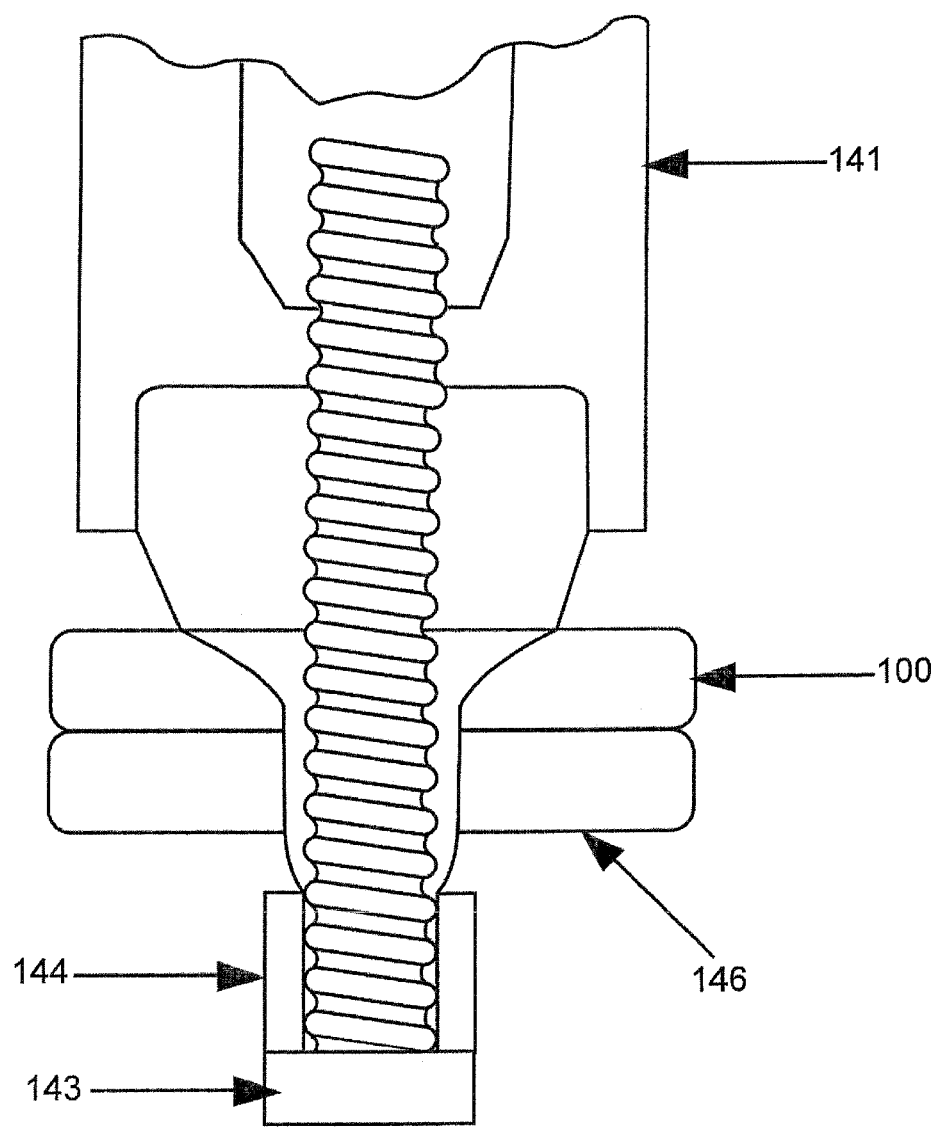
Figure 3C:
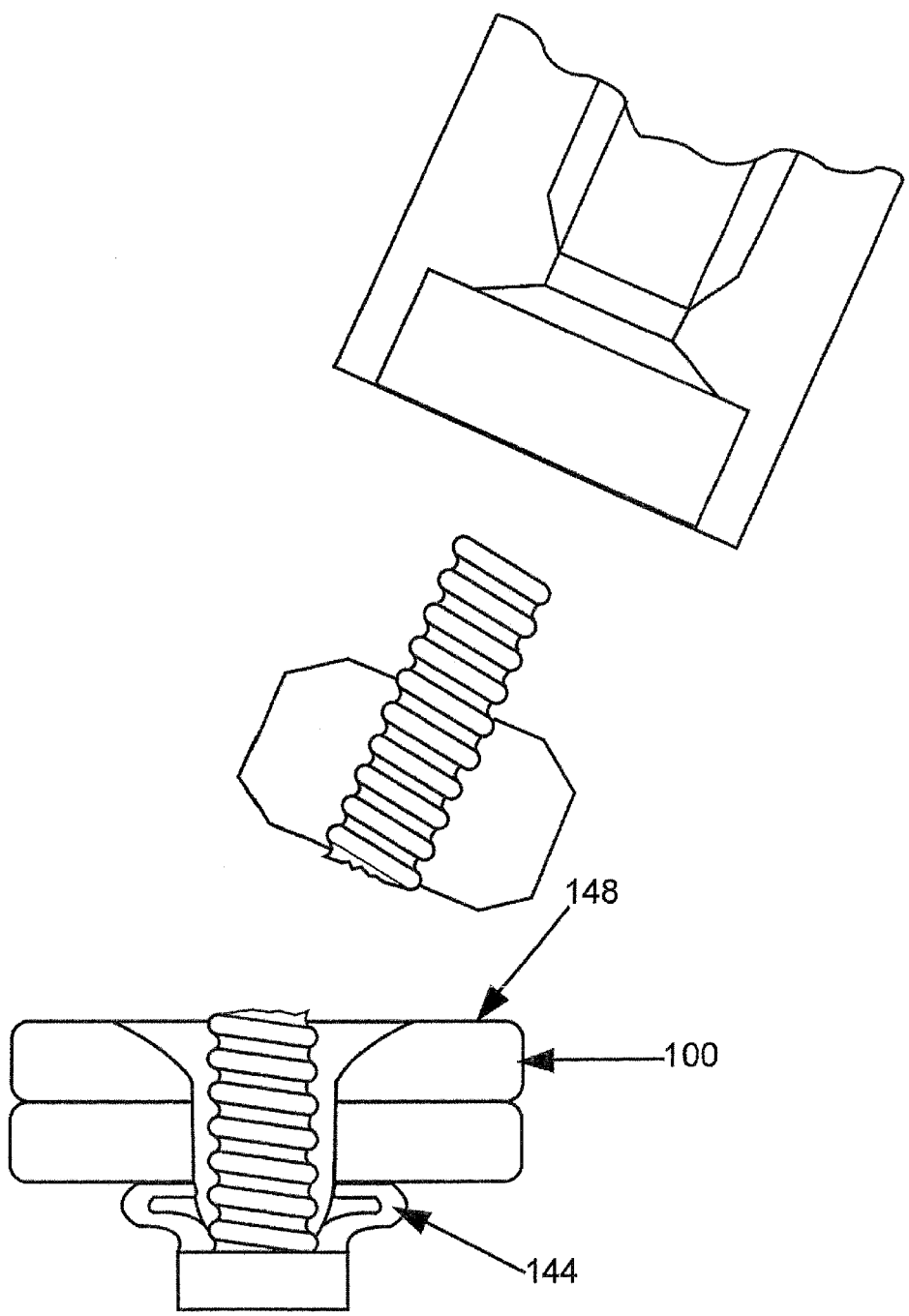

Plate 100 is fastened to structure 150 through any of several methods of attaching a plate to a structure, including a mechanical connector, chemical bonding, welding, adhesion or any other suitable attachment method. In one embodiment, a mechanical connector is used, and in a preferred embodiment a plurality of blind fasteners 130 are used to attach the plate 100 to the structure. In one embodiment blind fasteners 130 comprise Composi-Lok® break-off fasteners available from Monogram Industries, Inc., of Santa Monica, Calif. Referring to FIGS. 3(a)-3(c) the latter are installed in a hole or aperture 132 in the plate 100 and a match-drilled hole 134 in the outer skin 136 of the sandwich structure by positioning the fasteners in holes 132/134, and turning a drive nut 138 on the threaded shaft 140 using a drive tool 141. This snugs the shaft 140 in a nut 142 which draws the distal end 143 of the shaft up against the inside surface 146 of outer skin 136, draws the outer skin 136 and plate 100 together, and distorts the deformable blind sleeve 144. The shaft 140 is then snapped or cut off even with the top surface 148 of the plate 100.

Referring in particular to FIGS. 1 and 2, the pocket or cavity 110 in plate 100 contains a hole 105 and should have a depth sufficient to accommodate the head 210 of the stud 120. In a particular embodiment, the pocket or cavity 110 has approximately the same depth as the head 210 (shown in phantom in FIG. 1) of stud 120 such that the stud 120 is in contact or very nearly in contact with the structure 150 and the plate 100 when the plate 100 is securely fastened to the structure 150. The pocket or cavity 110 also may have a specific shape so as to restrict or prevent the movement of the stud 120. For example, the head 210 of the stud 120 may have a triangular shape and the pocket or cavity 110 may have a slightly larger triangular shape such that the head 210 is able to move translationally in a plane, i.e. in two directions, but is prevented from rotating. A rectangle, hexagon, or any other geometrical or any irregular shape may also be used in combination with the shape of the head 210 of the stud 120 to limit the rotational movement of the stud 120.

The stud 120 has a shaft 200 that is smaller than the hole 105 in the plate 100 and an end or head 210 that is larger than the hole 105 in the plate 100. That is, the shaft 200 of the stud 120 may pass through the hole 105 in the plate 100 while the head 210 may not. The stud 120 may be composed of steel or another metal, metal alloy, carbon composite or any other material that may be shaped into a stud. Stud 120 is long enough to extend through the plate 100 and be used to attach the secondary structure 300. The head 210 of the shaft may be shaped in conjunction with the pocket or cavity 110 of the plate 100 as described above so that the pocket or cavity 110 of the plate 100 constricts the rotational movement of the stud 120.

In one embodiment of the disclosure, the shaft 200 of the stud 120 includes a threaded portion 220 such that a secondary sub-assembly or structure 300 such as found on a spacecraft (see FIG. 4) may be attached to the stud 120 with a nut, for example, a locking nut 302. The constricted rotational movement of the stud 120 allows for tightening of the locking nut 302 on the threaded portion 220 of the stud 120. The secondary structure 300 also may be secured to the stud 120 by a cotter pin or the like passed through a hole (not shown) through the stud 120, or any other method of securing a structure to the stud 120. The stud 120 may also include a flanged portion 230 upon which the secondary structure may be supported.

In the context of an aircraft or spacecraft, the primary structure 150 is comprised of the body of spacecraft, typically constructed of a composite sandwich material. The stud 120 is passed through the hole 105 and the plate 110 is then attached to the composite sandwich material. This attachment is accomplished by passing blind fasteners 130 through the apertures 132 in the plate and into match drilled holes 134 in the composite sandwich material. Drive nut 138 is then turned using a drive tool 141 to secure the shaft of the blind fastener 140 in a nut 142 distorting the deformable blind sleeve 144. The shaft 140 is then snapped or cut off even with the top surface 148 of the plate 100. The insulation tile secondary structure 300 is then placed onto the stud and rested on the flanged portion 230. The secondary structure 300 is secured to the stud using a locking nut 302.

This process is repeated for each insulation tile that is to be attached to the body of the spacecraft. As tiles crowd next to each other, the head 210 floating in the pocket or cavity 110 of the plate 100 allows each tile to move within the constraints of the pocket or cavity 110. This movement accommodates any misalignment of the tiles during installation. After tightening, the screwhead may be given some protection from oxidation by covering it with a plug made of the same material as the insulating tile and designed to lie flush with the outer surface of the tiles.

The stud attachment allows for simple and repeatable removal of each tile as needed. The locking nut 302 is merely loosened and removed and the tile pulled from its position on the stud. The locking nut 302 may be reusable or disposable. The removed tile is reattached by placing the secondary structure 300 back onto the stud and rested on the flanged portion 230. The secondary structure 300 is resecured to the stud using the same or a new locking nut 302.

The present disclosure thus provides a simple and reliable system for attaching thermal protection panels to aircraft and spacecraft or the like. The system also advantageously may be employed for attaching panels together, and for attaching mounting brackets and internal systems such as plumbing or the like to a composite panel in an aircraft or spacecraft.

We claim:

1. A floating stud assembly system comprising:
    a plate configured to attach to an outer skin of a first structure while residing outside the outer skin of the first structure, wherein the plate includes a pocket extending into the plate from a first surface of the plate and a hole extending from the pocket through the plate, and wherein the hole has a first diameter and does not extend to an edge of the plate;
    a stud, wherein the stud comprises:
        a shaft configured to extend through the hole and protrude from a second surface of the plate wherein the shaft includes a flange, wherein a first portion of the shaft is on a first side of the flange, wherein a second portion of the shaft is on a second side of the flange, wherein the flange has a second diameter, wherein the second diameter is less than the first diameter, and wherein the second portion includes a securing mechanism; and
        a head configured to reside in the pocket, wherein the head is on the same side of the flange as the first portion of the shaft, wherein the head has a dimension that is larger than the first diameter enabling retention of the stud by the plate, wherein the pocket and the head are shaped and arranged to enable the stud to move translationally in two directions along two separate axes in a plane while limiting rotation of the stud about its longitudinal axis.

2. The floating stud assembly system of claim 1, wherein the first portion has a third diameter, and wherein the third diameter is less than the second diameter.

3. The floating stud assembly system of claim 2, wherein the second portion has a fourth diameter, and wherein the fourth diameter is less than the second diameter.

4. The floating stud assembly system of claim 1, wherein the pocket has a first triangular shape and the head has a second triangular shape.

5. The floating stud assembly system of claim 1, wherein the plate comprises titanium and wherein the stud comprises steel.

6. The floating stud assembly system of claim 1, wherein the structure comprises a honeycomb composite having two face sheets connected by a core element.

7. An assembly comprising:
    a first structure and a second structure assembled together by a floating stud assembly system, wherein the floating stud assembly system includes:
        a plate attached to an outer skin of the first structure, wherein the plate resides outside the outer skin of the first structure, wherein the plate includes a pocket extending into the plate from a first surface of the plate and a hole extending from the pocket through the plate, and wherein the hole has a first diameter and does not extend to an edge of the plate; and
        a stud, wherein the stud comprises:
            a shaft extending through the hole and protruding from a second surface of the plate, wherein the shaft includes a flange, wherein a first portion of the shaft is on a first side of the flange, wherein a second portion of the shaft is on a second side of the flange, wherein the flange has a second diameter, wherein the second diameter is less than the first diameter, and wherein the second portion includes a securing mechanism; and
            a head residing in the pocket, wherein the head is on the same side of the flange as the first portion of the shaft, wherein the head has a dimension that is larger than the first diameter and is retained by the plate, wherein the pocket and the head are shaped and arranged to enable the stud to move translationally in two directions along two separate axes in a plane while limiting rotation of the stud about its longitudinal axis.

8. The assembly of claim 7, wherein the flange supports the second structure such that the second structure is spaced apart from the plate by a portion of the first portion.

9. The assembly of claim 7, wherein the head is in direct contact with the outer skin.

10. The assembly of claim 7, wherein the plate is attached to the first structure by a blind fastener.

11. The assembly of claim 7, wherein the first portion has a third diameter, and wherein the third diameter is less than the second diameter.

12. The assembly of claim 7, wherein the first structure comprises a sandwich structure.

13. The assembly of claim 12, wherein the sandwich structure comprises a honeycomb composite having two face sheets connected by a core element.

14. The assembly of claim 7, further comprising a third structure coupled to the first structure via a second floating stud assembly system, wherein the third structure is adjacent to the second structure, wherein the second structure is configured to move in a first direction of the two directions when the third structure moves in the first direction, and wherein the second structure moving in the first direction causes the stud to move in the first direction.

15. The assembly of claim 7, wherein the securing mechanism enables the second structure to be coupled to the stud.

16. The assembly of claim 15, wherein the securing mechanism includes external threading on the second portion of the shaft.

17. The assembly of claim 15, wherein the securing mechanism includes a second hole through the second portion of the shaft, the second hole configured to receive a cotter pin, and wherein the cotter pin secures the second structure to the stud when inserted in the second hole.

18. A method for mechanically attaching a first structure to a second structure, the method comprising:
    passing a stud into a hole in a plate, wherein the hole has a first diameter and does not extend to an edge of the plate, wherein the plate comprises a pocket extending into the plate from a first surface of the plate, the hole extending from the pocket through the plate, wherein the stud comprises a shaft, wherein passing the stud into the hole causes the shaft to protrude from a second surface of the plate, wherein the stud further comprises a head that has a dimension that is larger than the first diameter, wherein passing the stud into the hole causes the stud to be retained by the plate, wherein the shaft includes a flange, wherein a first portion of the shaft is on a first side of the flange, wherein a second portion of the shaft is on a second side of the flange, wherein the head is on the same side of the flange as the first portion of the shaft, wherein the flange has a second diameter, wherein the second diameter is less than the first diameter, and wherein the second portion includes a securing mechanism;
    attaching the plate to the first structure; and securing the second structure to the stud using the securing mechanism, wherein the pocket and the head are shaped and arranged to enable the stud to move translationally in two directions along two separate axes in a plane while limiting rotation of the stud about its longitudinal axis.

19. The method of claim 18, further comprising attaching a plug to the stud, wherein the second structure includes a heat insulating material, and wherein the plug includes the heat insulating material.

20. The assembly of claim 7, wherein the second structure is directly in contact with the second side of the flange such that the second structure is spaced apart from the plate by a portion of the first portion.

\* \* \* \* \*